United States Patent
Dravneek et al.

(10) Patent No.: US 9,443,251 B2
(45) Date of Patent: *Sep. 13, 2016

(54) SYSTEM FOR ENCODING CUSTOMER DATA

(71) Applicant: Bank of America Corporation, Charlotte, NC (US)

(72) Inventors: Victoria L. Dravneek, Charlotte, NC (US); Richard H. Thomas, Charlotte, NC (US); Julie Mann Keppner, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,250

(22) Filed: Nov. 24, 2015

(65) Prior Publication Data

US 2016/0110731 A1    Apr. 21, 2016

Related U.S. Application Data

(63) Continuation-in-part of application No. 14/849,626, filed on Sep. 10, 2015, which is a continuation of application No. 14/518,076, filed on Oct. 20, 2014, now Pat. No. 9,159,069.

(51) Int. Cl.
| | |
|---|---|
| *G06K 15/00* | (2006.01) |
| *G06Q 30/02* | (2012.01) |
| *H04L 29/06* | (2006.01) |
| *G06F 21/62* | (2013.01) |
| *G06Q 30/00* | (2012.01) |

(52) U.S. Cl.
CPC ....... *G06Q 30/0201* (2013.01); *G06F 21/6263* (2013.01); *G06Q 30/01* (2013.01); *H04L 63/08* (2013.01); *G06Q 2250/00* (2013.01)

(58) Field of Classification Search
CPC .......... G06F 7/00; G06F 17/00; G06F 17/30; G06K 15/00; G06K 19/00
USPC ........... 235/383, 375, 376, 487; 707/100, 10
See application file for complete search history.

(56) References Cited

U.S. PATENT DOCUMENTS

| | | | |
|---|---|---|---|
| 2003/0144960 A1* | 7/2003 | Galka | G06F 21/10 705/52 |
| 2004/0030598 A1* | 2/2004 | Boal | G06Q 30/02 705/14.25 |
| 2004/0111375 A1* | 6/2004 | Johnson | G06Q 20/06 705/64 |
| 2005/0021540 A1* | 1/2005 | McKee | G06Q 10/10 |
| 2005/0122332 A1* | 6/2005 | Boyd | G06F 9/325 345/501 |
| 2007/0055648 A1* | 3/2007 | Matsumoto | G06F 17/30893 |

* cited by examiner

Primary Examiner — Edwyn Labaze
(74) Attorney, Agent, or Firm — Michael A. Springs

(57) ABSTRACT

A system for authenticating a customer includes a network interface and a processor. The network interface communicates a request for customer data associated with a particular customer. It also receives a customer profile code associated with the customer, wherein the customer profile code comprises a first code segment and a second code segment. It further receives first and second rules associated with the customer profile code. The processor transforms the first and second code segments into customer data using the rules. It further authenticates the customer using the customer data.

15 Claims, 7 Drawing Sheets

SYSTEM FOR ENCODING CUSTOMER DATA

CROSS-REFERENCE TO RELATED APPLICATIONS

This application is a continuation-in-part of U.S. patent application Ser. No. 14/849,626, filed Sep. 10, 2015 and entitled, "System for Encoding Customer Data," which is a continuation of U.S. patent application Ser. No. 14/518,076, filed Oct. 20, 2014 which is now U.S. Pat. No. 9,159,069 issued Oct. 13, 2015 and entitled "System for Encoding Customer Data."

TECHNICAL FIELD

This invention relates generally to analyzing and communicating data, and more particularly to encoding customer data.

BACKGROUND

Enterprises assemble vast amounts of customer data. In conventional systems, enterprises communicate uncoded customer data in accordance with a customer identifier, such as a customer account number. This is problematic because uncoded data is susceptible to security breaches and uncoded data uses a substantial amount of resources, such as bandwidth and memory.

SUMMARY OF EXAMPLE EMBODIMENTS

According to embodiments of the present disclosure, disadvantages and problems associated with communicating customer data may be reduced or eliminated.

In accordance with a particular embodiment of the present disclosure, a rules engine stores a first rule, a second rule, and customer data, wherein the customer data is associated with a particular customer. The rules engine transforms a portion of the customer data into a first code segment by applying a first rule and transforms a portion of the customer data into a second code segment by applying a second rule. In addition, the rules engine combines at least the first code segment and the second code segment to form a customer profile code. The customer profile code is associated with a customer identifier. A decision engine communicatively coupled to the rules engine stores third party data, wherein the third party data is associated with a request for customer information. The decision engine determines whether the customer identifier of the customer profile code matches the third party data, and an interface engine communicatively coupled to the decision engine communicates the customer profile code to a third party if the customer identifier of the customer profile code and the third party data match.

Certain embodiments of the present disclosure may provide one or more technical advantages. A technical advantage of one embodiment includes saving resources such as bandwidth and memory by consolidating large amounts of customer data within an enterprise into a centralized unit and transforming that data, on a customer by customer basis, into a unique customer profile code. As another example, a technical advantage of one embodiment includes mitigating data breaches by communicating secured customer data to third parties via a customer profile code. And a further technical advantage of an embodiment includes conveniently, efficiently, and securely transferring customer data to third parties by sharing an enterprise's encoded customer profile code with a third party via a secure application programming interface (API). As a final example, a technical advantage of one embodiment includes providing greater efficiencies for computer resources and network usage.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-7, like numerals being used for like and corresponding parts of the various drawings.

Enterprises are organizations and typically include business units, divisions, or lines of businesses that handle the trade of various goods and services within the enterprise. Services may include, but are not limited to, transforming customer data into customer profile codes so that it can be efficiently and securely shared with third parties. Services may further include, but are not limited to, transforming customer profile codes back into customer data after it has been securely received by third parties.

To facilitate providing encoded customer data, enterprises may communicate encoded customer profile codes to third parties via networks. Typically, enterprises store customer data according to a customer identifier, such as a customer account number. The teachings of this disclosure recognize that it would be desirable to provide a rules engine that transforms the customer data into code segments and combines the code segments to form a customer profile code, thus creating a snapshot of the customer data. The teachings of this disclosure also recognize that it would be desirable to provide a decision engine that communicates a customer profile code to a third party if the customer identifier associated with the customer profile code matches third party data. Further, the teachings of this disclosure recognize that when a customer identifier of a customer profile code matches third party data, it would be desirable to communicate the rules and the code segments to a third party to enable the third party to decode the customer profile code. The teachings of this disclosure further recognize that a third party may receive the code segments and transform them back into the customer data by applying rules communicated by the enterprise.

As such, the teachings of this disclosure provide for greater efficiencies in computer resources and network usage. For example, by transforming vast amounts of customer data into compressed customer profile codes, less resources such as bandwidth and memory are required to store the customer data and to communicate the customer data both internally within the enterprise and externally to third parties. Further, the teachings of this disclosure provide for greater security of an enterprise's customer data. For instance, by encoding the customer data, the enterprise reduces the risk of third parties gaining access to its customer data without the enterprise's consent.

Figure 1:
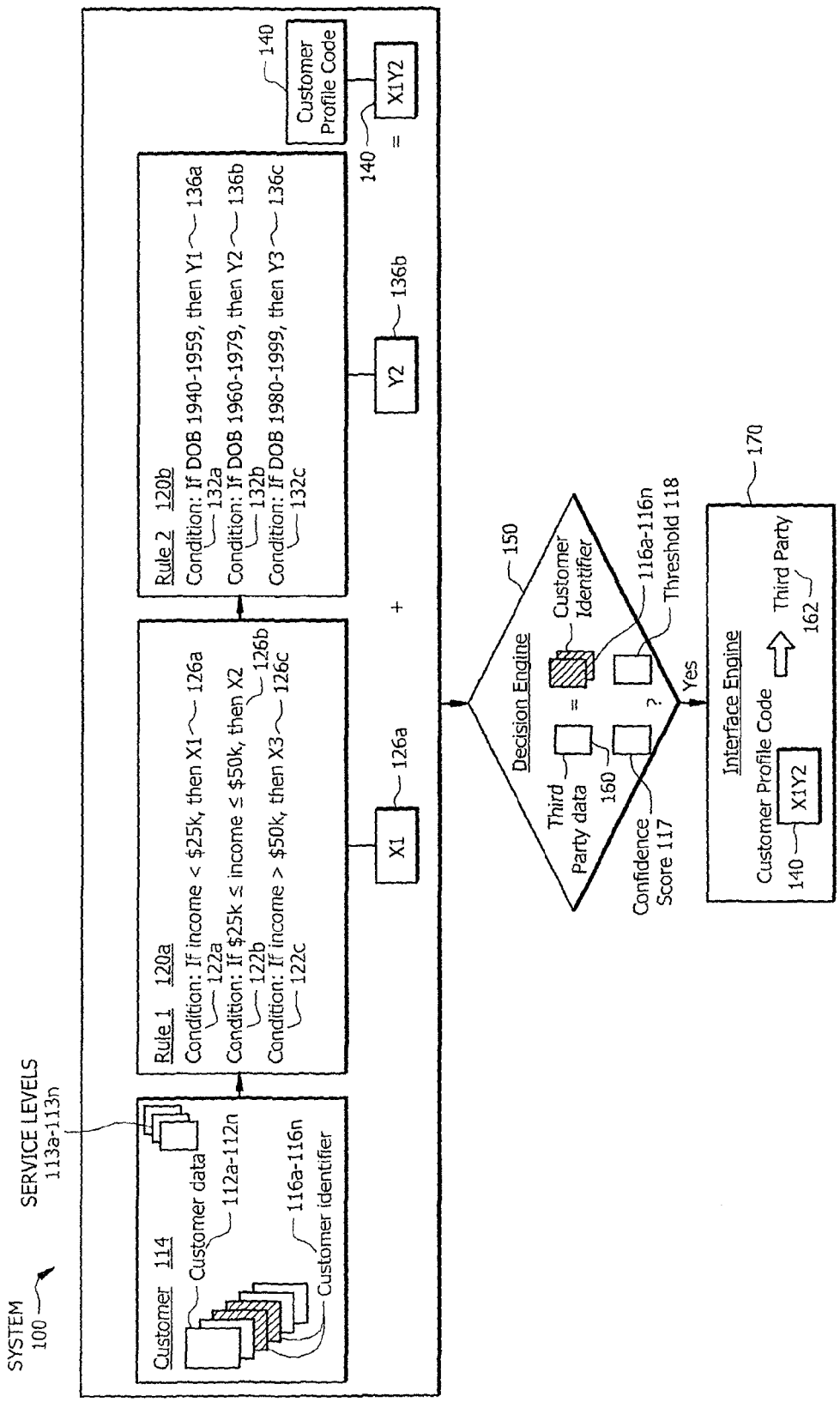
FIG. 1 illustrates an example embodiment of a system for encoding customer data.

FIG. 1 illustrates a system for encoding customer data. More specifically, system 100 includes rules engine 110, decision engine 150, and interface engine 170. Generally, rules engine 110, decision engine 150, and interface engine 170 interact to efficiently analyze, transform, and communicate customer data.

In the illustrated embodiment of FIG. 1, rules engine 110 stores customer data 112, first rule 120a, and second rule 120b. Customer data 112a-112n represents the data of a particular customer 114, wherein n represents any suitable number. Customer data 112 may include descriptive data such as, for example, customer 114's demographic data (e.g., age, gender, ethnicity), spoken languages, employment data (e.g., employment status, employer, employment history, direct deposit information), life cycle events (e.g., retirement, having a child, buying a house, sending child to college), geographic data (e.g., travel history, location of residence, location of customer upon occurrence of various events), medical information (e.g., medical payment history, patient status, medication purchases, hospital or doctor visits, health information), educational information (e.g., degrees, tuition, loans, class schedules), and financial information (e.g., income, investments, trades, options, contracts, margins, portfolios, account information). Further, customer data 112 may include behavioral data, or general patterns exhibited by customer 114 when using certain products or services. For example, behavioral data may include customer 114's shopping habits (e.g., purchasing, browsing, and registering activities, merchant/customer data, SKU level data for items purchased), bank account activities, loan and mortgage commitments, and operations information. Behavioral data may also include, for instance, the frequency in which customer 114 visits an institution or call center, customer 114's inquiries at an institution or call center, and customer 114's recorded conversations with an associate of an enterprise. Customer data 112 is not limited to descriptive and behavioral data and can include any data associated with customer 114.

In addition, customer data 112 may comprise one or more customer identifiers 116. Customer identifier 116 is any identifier associated with customer 114 that differentiates customer 114 from other customers of an enterprise. For example, customer identifier 116 may be a phone number, an email address, biometric information (e.g., voice scan, retina scan, fingerprint, facial recognition, and the like), or an account number of customer 114. In some embodiments, customer identifier 116 may include customer 114's physical address or customer 114's driver's license number. Customer identifier 116 can be any data suitable to identify customer 114. Customer identifier 116 may also be associated with any of the following: a user device identifier (e.g., computer MAC address, mobile identification number, mobile subscription identification number, International Mobile Station Equipment Identity or IMEI, or the like); student identification number; account number; card number; dynamic token; social media profile or token; or any other unique or semi-unique identifying information.

In one embodiment, customer data 112 is associated with service levels 113a-n. The different service levels 113 may determine what level of access to customer data 112 a particular third party is entitled to receive. For example, some customer data 112 may be associated with one service level 113—such as a lower tier of service—and other customer data 112 may be associated with another service level 113—such as a higher tier of service. The different tiers of service levels 113 may then be associated with particular third parties that may request access to the customer data 112. Thus, a particular third party that pays a higher price, enjoys a trusted status with the enterprise, or otherwise maintains a higher status may be entitled to more, different, or enhanced customer data 112 associated with a higher service level 113. In contrast, another third party that may pay a lower price, have a less trusted or untrusted status with the enterprise, or otherwise maintains a lower status may be entitled to less or basic customer data 112 associated with a lower service level 113. Alternatively or in addition, third parties in different industries may get access to different customer data 112 and service levels 113. Third parties can subscribe with the enterprise to gain access to the customer data 112 as a part of an on-boarding process. During this on-boarding process, the third parties can subscribe to a particular service level 113 for a particular subscription fee.

Rules 120a-120n of rules engine 110 include any parameters for classifying customer data 112. For example, rules 120 may facilitate classification of customer data 112 in accordance with any of the variety of customer data described above, such as for example, customer 114's income, transactional history, credit rating, or date of birth. Rules 120a-120n may be created or managed by devices, persons, or any other suitable source. For example, associates may write specific rules for third party 162. As another example, software may be used to evolve rules 120a-120n over time based on patterns shown by system 100.

Rules engine 110 of system 100 also includes first rule 120a as shown in FIG. 1 of the illustrated embodiment. First rule 120a may include one or more conditions 122a-122n, wherein n represents any suitable number. First rule 120a may also include one or more code segments 126a-126n, wherein n represents any suitable number. In some embodiments, conditions 122a-122n are associated with code segments 126a-126n. For example, condition 122f may be associated with code segment 126f. In the illustrated embodiment of FIG. 1, conditions 122a, 122b, and 122c are associated with income brackets. Customer data 112g may represent customer 114's income. As such, if customer income data 112g falls below $25,000 annually, then rules engine 110 transforms 112g into code segment 126a, which is represented by "X1" in FIG. 1. Similarly, if customer income data 112g falls at or between $25,000 and $50,000 annually, then rules engine 110 transforms customer income data 112g into code segment 126b, represented by "X2". And if customer income data 112g is above $50,000 annually, then rules engine 110 transforms customer income data 112g into code segment 126c, represented by "X3". For example, if customer income data 112g is $15,000 annually, then rules engine 110 transforms customer income data 112g into code segment "X1", as shown in the illustrated embodiment of FIG. 1.

Though only one condition is satisfied in the illustrated embodiment of FIG. 1, more than one condition may be satisfied in other embodiments, or no condition may be satisfied, depending on the parameters of customer data 112. Further, in some embodiments, first rule 120a includes less than three conditions. Alternatively, first rule 120a may include more than three conditions, for example ten conditions. Further, conditions 122a, 122b, and 122c may be associated with more than one type of customer data. For example, condition 122a may be associated with customer 114's income whereas conditions 122b and 122c are associated with customer 114's quantity of purchases within a given period of time. Moreover, different rules 120 and conditions 122 may be used in conjunction with the specific service levels 113 described above and with reference to FIG. 4, customer authentication requests described with reference to FIG. 5, geographical areas described with reference to FIG. 6, and customer operations history described with reference to FIG. 7. The rules 120 and conditions 122 used in those embodiments may depend on the particular request for customer data 112 or the particular retrieved customer data 112.

In some embodiments, rules engine 110 of system 100 further comprises second rule 120b. Second rule 120b may include one or more conditions 132a-132n, wherein n represents any suitable number. Second rule 120b may also include one or more code segments 136a-136n, wherein n represents any suitable number. In some embodiments, conditions 132a-132n are associated with code segments 136a-136n. For example, condition 132g may be associated with code segment 136g. In the illustrated embodiment of FIG. 1, conditions 132a, 132b, and 132c are associated with birth year brackets. Customer data 112h may represent customer 114's birth year. As such, if birth year customer data 112h falls at or between the years "1940" and "1959", then rules engine 110 transforms customer data 112h into code segment 132a, represented by "Y1". Similarly, if birth year customer data 112h falls at or between the years "1960" and "1979", then rules engine 110 transforms customer data 112h into code segment 132b, represented by "Y2". And if birth year customer data 112h falls at or between the years "1980" and "1999", then the rules engine transforms customer data 112h into code segment 132c, represented by "Y3". For example, if birth year customer data 112h is the year "1967", then rules engine 110 transforms customer birth year data 112h into code segment "Y2", as shown in the illustrated embodiment of FIG. 1.

While first rule 120a includes three conditions 122a, 122b, and 122c, and second rule 120b includes three conditions 132a, 132b, and 132c in the illustrated embodiment of FIG. 1, rules engine 110 of system 100 may include more or less than two rules, and each rule may include more or less than three conditions. For example, rules engine 110 may comprise 1,000 rules, wherein each rule includes 100 conditions. As another example, rules engine 110 may comprise a first rule with five conditions, a second rule with 100 conditions, and a third rule with one condition. Conditions 122a-122n and 132a-132n may be associated with more than one type of customer data 112. For example, condition 122a may be associated with customer 114's birth year, condition 122b may be associated with customer 114's purchases, and condition 122c may be associated with customer 114's income. Further, while rules 120a and 120b in the illustrated embodiment include conditions, rules 120a-120n may instead or in addition include any suitable information for use in the operation of rules engine 110.

In some embodiments, rules engine 110 of system 100 transforms at least a portion of customer data 112a-112n into a customer profile code 140 based on at least a combination of code segments 126a-126n and 136a-136n. For example, as shown in the illustrated embodiment of FIG. 1, rules engine 110 concatenates code segment 126a, represented by "X1", and code segment 136b, represented by "Y2", to generate customer profile code 140, represented by "X1Y2". In some instances, rules engine 110 may concatenate more than two code segments to generate customer profile code 140, for example "X1Y2Z3". Rules engine 110 may transform customer data 112a-112n in any manner suitable for compressing or securing customer data 112a-112n. For example, transforming customer data 112a-112n may include encoding, encrypting, or hashing customer data 112a-112n.

While rules engine 110 in the illustrated embodiment of FIG. 1 concatenates code segments 126a and 136b to form customer profile code 140, rules engine 110 may transform code segments 126a-126n and 136a-136n in any manner suitable for coding data. For instance, code segments 126a ("X1") and 136b ("Y2") may jointly be represented by alphanumeric characters "A1", by the number "10", or by a symbol, such as a triangle. Further, customer profile code 140 may utilize any coding system suitable to protect against the unauthorized use of customer 140's information. For example, customer profile code 140 may be an alphanumeric code, as shown in the illustrated embodiment of FIG. 1. As another example, customer profile code may be a binary code. Rules engine 110 may generate customer profile codes 140 for multiple customers 114a-114n.

Some customer profile codes 140 may be more sophisticated than other customer profile codes 140. For instance, a customer with a large amount of customer data 112 may have a more sophisticated customer profile code 140 than a customer with a less amount of customer data 112. Further, in some embodiments customer profile code 140 is associated with customer identifier 116. Customer identifier 116 may be located within customer data 112a-112n and can be any data that differentiates customer 114 from other customers of enterprise 210. For example, customer identifier 116 may be customer 114's social security number, customer 114's bank account number, or customer 114's email address.

Rules engine 110 of system 100 may apply rules 120a-120n to customer data 112 on a periodic or continuous basis to generate customer profile code 140. For example, rules engine 110 may generate customer profile code 140 periodically by applying rules 120a-120n to customer data 112 once every minute, once a week, or three times a week. As another example, rules engine 110 may apply rules 120a-120n to customer data 112 in real time so that the customer profile code 140 is always based on the most recent customer data 112a-112n. In some embodiments, rules engine 110 may only apply certain rules to the exclusion of others to generate customer profile code 140. Similarly, rules engine 110 may only apply certain conditions to the exclusion of others to generate customer profile code 140.

System 100 as shown in the illustrated embodiment of FIG. 1 also includes decision engine 150. Decision engine 150 is communicatively coupled to rules engine 110 and is operable to store third party data 160 associated with a request for customer information. Third party data 160 is information that can be used to identify customer 114 of enterprise 210, such as an email address, a telephone number, a social security number, or a bank account number.

Decision engine 150 may also store customer data 112a-112n, customer identifiers 116a-116n, or a portion thereof.

Decision engine 150 is further operable to determine whether customer identifier 116 of customer profile code 140 matches third party data 160. For example, if customer identifier 116 is represented by phone number 555-0102, and third party data 160 is represented by phone number 555-0102, then decision engine 150 verifies a match between customer identifier 116 and third party data 160. In some embodiments, decision engine 150 may determine whether third party data 160 matches more than one customer identifier 116a-116n. For instance, system 100 may require that two pieces of third party data, for example 160a and 160b, match two customer identifiers, for example 116a and 116b. In some embodiments, decision engine 150 may determine a confidence score 117 based on the number and type of customer identifiers 116 that match third party data 160. For example, if a suitable number (e.g., 3) of customer identifiers 116 match third party data 160; or if highly trusted types of customer identifiers 116 (e.g., biometric data; collection of biographic of unique information) matches third party data 160; or any suitable combination of number of type of customer identifiers 116 match third party data 160, then decision engine 150 may register a higher confidence score 117. If the confidence score 117 meets or exceeds a predetermined customer identifier threshold 118, then decision engine 150 determines a match. If the confidence score 117 falls below the threshold 118, then decision engine 150 determines a mismatch. The level of threshold 118 can be set (e.g., high, low or medium) depending on the type of customer data 112 requested (e.g., higher threshold 118 for more sensitive customer data 112), the service level 113 of the third party requesting the customer data 112 (e.g., lower threshold for third party with high service level 113), the particular customer 114, or any suitable number and combination of the foregoing.

Decision engine 150 is further operable to determine what customer data 112 a particular third party is entitled to based on service levels 113. For example, a third party that enjoys a high service level 113 with the enterprise may be entitled to a particular portion of customer data 112, while a third party that enjoys a lower service level 113 with the enterprise may be entitled to a different portion of customer data 112. As described above, the service level 113 associated with a particular third party may be determined according to the third party's subscription with the enterprise as established during an on-boarding process. The third party's subscription can also be terminated as part of an off-boarding process and the terminated third party would no longer have access to customer data 112 in that situation. In response to a request for customer data 112 from a third party, decision engine 150 determines the identity and service level 113 of the third party and retrieves the appropriate customer data 112 according to the determined service level 113 for that third party.

System 100 of the illustrated embodiment of FIG. 1 also includes an interface engine 170. Interface engine 170 is communicatively coupled to decision engine 150 and operable to communicate customer profile code 140 to third party 162 if customer identifier 116 of customer profile code 140 matches third party data 160. Third party 162 can be any party external to enterprise 210 that can benefit from receiving customer information that has been transformed into code segments based on conditions such as income and birth year. Examples of third parties 162 include merchants, health care organizations, credit card companies, financial institutions, e-commerce sites, social media sites, or financial sites such as financial planning websites. In addition, third party 162 may be a realty site or an aggregator.

Interface engine 170 of system 100 may be further operable to communicate rules 120a-120n, conditions, 122a-122n and 132a-132n, and code segments 126a-126n and 136a-136n to third party 162 to facilitate decoding of customer profile code 140. For example, if customer identifier 116 of customer profile code 140 matches third party data 160, interface engine 170 may communicate first rule 120a and second rule 120b to third party 160. Further, if customer identifier 114 of customer profile code 140 matches third party data 160, interface engine 170 may communicate the code segments associated with the satisfied conditions to third party 162 to enable third party 162 to decode customer profile code 140. As such, in accordance with the illustrated embodiment of FIG. 1, third party 162 can utilize code segment 126a ("X1") to associate third party data 160 with an income less than $25,000 annually. Similarly, third party 162 can utilize code segment 136b ("Y2") to associate third party data 160 with a date of birth between the years 1960 and 1979.

Interface engine 170 of system 100 may operate as an application programming interface (API). As such, interface engine 170 may communicate customer profile code 140 to third party 162 by granting third party 162 access to customer profile code 140 via the API. In addition, interface engine 170 may communicate rules 120a-120n, conditions, 122a-122n and 132a-132n, and code segments 126a-126n and 136a-136n to third party 162 by granting third party 162 access to the API. By utilizing a secure API, an enterprise can efficiently and conveniently share customer profile codes and other information operable to decode the customer profile codes with third parties.

Transforming customer data 112 into customer profile codes 140 leads to greater efficiencies of system 100. Because customer profile codes 140 represent compressed versions of customer data 112, they can be stored using less memory and communicated using less bandwidth. Further, customer profile codes 140 are less susceptible to breach since they are encoded. And because customer profile codes 140 represent satisfied conditions rather than specific customer data 112a-112n, customer data 112a-112n of enterprise 210 remains protected.

Modifications, additions, or omissions may be made to system 100 without departing from the scope of the invention. For example, system 100 may include any number of rules engines 110, decision engines 150, and interface engines 170. As another example, decision module 150 may request third party data 160 from an external module. Furthermore, the components of system 100 may be integrated or separated. For example, rules engine 110 and decision engine 150 may be incorporated into a single component. In another example, decision engine 150 and interface engine 170 may be incorporated into a single component.

Figure 2:
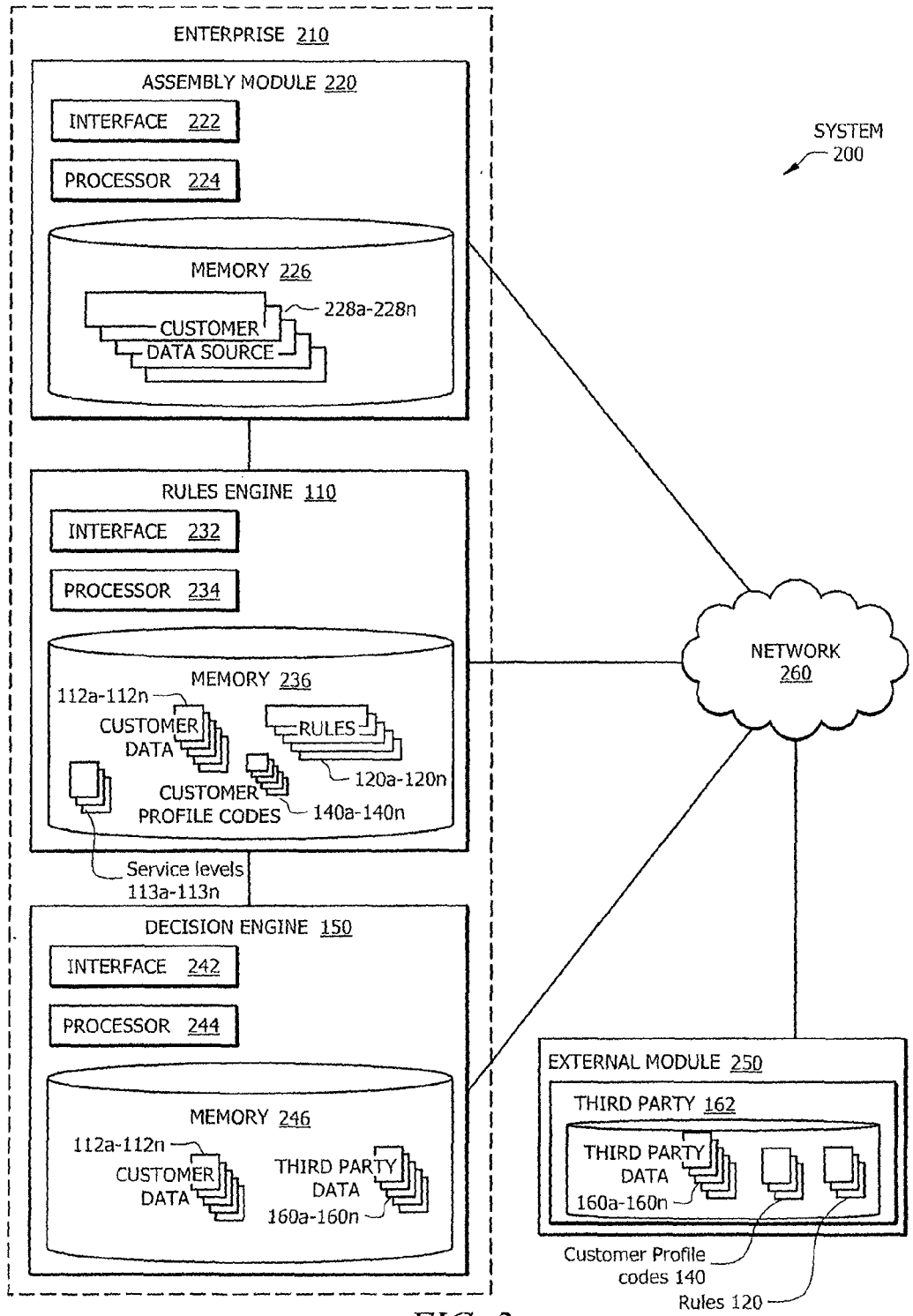
FIG. 2 illustrates a block diagram of an example system for encoding customer data.

FIG. 2 illustrates a system for encoding customer data. More specifically, system 200 includes enterprise 210, assembly module 220, rules engine 110, decision engine 150, and external module 250. Generally, assembly module 220, rules engine 110, and decision engine 150 interact to efficiently assemble, analyze, and communicate data. Assembly module 220, rules engine 110, and decision 150 may be located internal or external to enterprise 210. Assembly module 220, rules engine 110, decision engine 150, external module 250, and other components within system 200 may be communicatively coupled by network 260.

In the illustrated embodiment of FIG. 2, assembly module 220 comprises interface 222, processor 224, and memory 226. Memory 226 of assembly module 220 includes customer data sources 228a-228n, wherein n represents any suitable number. Customer data sources 228a-228n may be associated with customer 114 and may include customer data 112a-112n, such as demographic and behavioral data of customer 114.

In one embodiment, as described in greater detail below with respect to FIG. 5, customer data 112 may be associated with a particular customer 114 to be authenticated by a third party. In this embodiment, a third party may seek to authenticate a particular customer. For example, a merchant, a bank, or a credit card company may be trying to determine whether to offer a credit card to a customer and, if so, how big of a credit line to associate with the credit card. In this example, the third party requests customer data 112 (e.g., annual salary, employment status, monthly deposits into account; interruptions to automatic deposit; annual spend; etc.) for this particular customer 114 to inform its decision of whether and how much credit to offer to the customer 114 based on the received customer data 112. In another example, a third party may be attempting to verify the identity of a particular customer 114 with whom it is interacting. In this example, the third party requests customer identification information from the customer and customer data 112 (e.g., demographic information; account information; other identifying data) from the enterprise. If the customer identification information from the customer matches the customer data 112 received from the enterprise, then the customer's identity is verified. Each of these examples is generally referred to as authenticating a customer 114. The customer data 112 provided in either or both of the above examples can fall into a specific range (e.g., annual salary of customer 114 is between $50,000 and $99,999) or be a specific value or statement (e.g., customer 114 is unemployed).

In another embodiment, as described in greater detail below with respect to FIG. 6, customer data 112 may be associated with one or more customers 114 in a particular geographical region, such as in a particular one or more cities or zip codes. In this embodiment, the customer data 112 may be associated with particular customers 114 in the geographic region, may be aggregated for all customers 114 in the geographic region, or may be aggregated for a subset of customers 114 in the geographic region where that subset of customers 114 share certain common characteristics (e.g., common demographic information or common behavioral information). A third party that requests this customer data 112 specific to a particular geographic area may then use it to analyze the potential of providing goods and services in that geographical area. In one embodiment, a third party merchant may use this information to determine which additional geographic markets it should or should not enter, or which targeted goods or services to offer in a particular existing geographic market.

For example, a high-end grocery chain can request and analyze customer data 112 to determine the shopping habits and trends of its targeted demographic customers 114 in a particular city or zip code to determine whether or not to open a new store in that geographical area. In another example, the high-end grocery chain may analyze customer data 112 to determine that it should market and sell more or less of a particular good or service in a particular one of its stores based on the shopping habits or trends of its targeted demographic customers 114 in that geographical area. In still another example, a healthcare organization may request and analyze the medical payment history or medication purchase information for a targeted demographic of customers 114 to determine whether or not to open a doctor's office or offer particular health goods or services (e.g., using SKU level data) in a particular geographical area. The healthcare company can also use customer data 114 to set up their business in a new geographic area by determining their competitors' pricing structure in that area. These examples are non-limiting and provided to explain the underlying methodology for how customer data 112 can be used to analyze opportunities in a particular geographic area.

In still another embodiment, as described in greater detail below with respect to FIG. 7, customer data 112 may be associated with a particular set of customers 114 associated with a particular third party. For example, a third party merchant may seek information for a set of its existing customers or a set of potential customers for its goods and services. This third party merchant may then use the customer data 112 for these customers 114 to determine their operations history (e.g., where that set of customers 114 spends money to purchase goods and services; how much money that set of customers 114 spends on goods and services elsewhere; the frequency of spending for that set of customers; etc.). The third party merchant can then use this information to target those locations for its own sales and marketing. In one embodiment, if a first merchant determines that its customers are spending a lot of money purchasing goods and services at a second merchant (whether online or brick and mortar), then that first merchant can target its marketing activities in conjunction with the second merchant, and vice versa.

For example, a high-end grocery chain can use customer data 112 to determine that its existing or potential customers 114 are spending their disposable income at nearby golf courses and movie theaters, and purchasing gas at particular gas stations. The grocery chain can analyze this customer data 112 to then perform targeted marketing (e.g., advertising, coupons, joint promotions and the like) in those places where its existing or potential customers are otherwise spending their money. In these examples, the customer data 112 may be aggregated over a subset of customers 114 sharing particular demographic information or other characteristics. These examples are non-limiting and provided to explain the underlying methodology for how customer data 112 can be used to determine an operations history for customers 114, which includes where the customer 114 spends money, how much, how frequently, and other associated trends.

Customer data sources 228a-228n of assembly module 220 represent any sources of information that may be used by assembly module 220 and/or components of enterprise 210. Customer data sources 228a-228n may include a device (such as a database, a personal computer, a workstation, a laptop, a wireless or cellular telephone, an electronic notebook, a personal digital assistant, or any other device capable of receiving, processing, storing, and/or communicating information), a person (such as a person who has knowledge of an entity and who provides such knowledge for communication to assembly module 220), any other suitable source of information, or any combination of the preceding. In certain embodiments, assembly module 220 may receive information from customer data sources 228a-228n to communicate to rules engine 110 and decision engine 150. Customer data sources 228a-228n may be located in enterprise 210 or any other location that allows for customer data sources 228a-228n to communicate via network 260.

Assembly module 220 may include a network service, any suitable remote service, a mainframe, a host computer, a workstation, a web server, a personal computer, a file server, or any other suitable device operable to communicate with enterprise 210. In some embodiments, assembly module 220 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. The functions of assembly module 220 may be performed by any suitable combination of one or more servers or other components at one or more locations. In the embodiment where the modules are servers, the servers may be public or private servers, and each server may be a virtual or physical server. The server may include one or more servers at the same or at remote locations. Also, assembly module 220 may include any suitable component that functions as a server.

System 200 of the illustrated embodiment of FIG. 2 also includes rules engine 110, which is communicatively coupled to assembly module 220. Rules engine 110 may include interface 232, processor 234, and memory 236. In the illustrated embodiment, memory 236 includes customer data 112*a*-112*n*, rules 120*a*-120*n*, and customer profile codes 140*a*-140*n*. System 200 of the illustrated embodiment of FIG. 2 further includes decision engine 150. Decision engine 150 is communicatively coupled to rules engine 110 and may comprise interface 242, processor 244, and memory 246. In the illustrated embodiment, memory 246 includes customer data 112*a*-112*n* and third party data 160*a*-160*n*. In addition, system 200 comprises external module 250, as shown in the illustrated embodiment of FIG. 2. External module 250 includes third party data 160*a*-160*n*.

Network 260 facilitates communications between enterprise 210, assembly module 220, rules engine 110, decision engine 150, and external module 250. This disclosure contemplates any suitable network 260 operable to facilitate communication between the components of system 200. Network 260 may include any interconnecting system capable of transmitting audio, video, signals, data, messages, or any combination of the preceding. Network 260 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 260.

System 200 includes one or more interfaces. For example, the illustrated embodiment of FIG. 2 includes interface 222 for assembly module 220, interface 232 for rules engine 110, and interface 242 for decision engine 150. Interfaces 222, 232, and 242 represent any suitable device operable to receive information from network 260, transmit information through network 260, perform suitable processing of the information, communicate to other devices, or any combination of the preceding. For example, interface 222 of assembly module 220 transmits customer data 112*a*-112*n* to rules engine 110, and interface 232 of rules engine 110 receives customer data from interface 222. As another example, interface 242 of decision engine 150 may receive third party data 160 from external module 250 and may communicate customer profile code 140 to external module 250 if customer identifier 116 matches third party data 160. Interfaces 222, 232, and 242 represent any port or connection, real or virtual, including any suitable hardware and/or software, including protocol conversion and data processing capabilities, to communicate through a LAN, WAN, or other communication system that allows enterprise 210 to exchange information between assembly module 220, rules engine 110, decision engine 150, external module 250, network 260, and other components of system 200.

In addition, system 200 includes one or more processors. For example, the illustrated embodiment of FIG. 2 includes processor 224 for assembly module 220, processor 234 for rules engine 110, and processor 244 for decision engine 150. Processors 224, 234, and 244 control the operation and administration of enterprise 210 by processing information received from interfaces 222, 232, and 242. As such, processors 224, 234, and 244 are communicatively coupled to interfaces 222, 232, 242, respectively. Processors 224, 234, 244, and 254 include any hardware and/or software that operates to control and process information. For example, processor 234 utilizes rules 120*a*-120*n* to control the operation of rules engine 110. Processor 224, 234, or 244 may be a programmable logic device, a microcontroller, a microprocessor, any suitable processing device, or any suitable combination of the preceding.

System 200 further includes one or more memories. For example, the illustrated embodiment of FIG. 2 includes memory 226 for assembly module 220, memory 236 for rules engine 110, and memory 246 for decision engine 150. Memory 226, 236, or 246 may represent a database that stores, either permanently or temporarily, customer data 112*a*-112*n* or rules 120*a*-120*n*. Memory 226, 236, or 246 includes any one or a combination of volatile or non-volatile local or remote devices suitable for storing information. For example, memory 226, 236, or 246 may include Random Access Memory ("RAM"), Read-only Memory ("ROM"), magnetic storage devices, optical storage devices, or any other suitable information storage device or a combination of these devices. Memory 226, 236, or 246 may include any suitable information for use in the operation of enterprise 210. Additionally, memory 226, 236, or 246 may be a component external to enterprise 210 and may be situated in any location suitable for memory to communicate to the other modules of system 200. Assembly module 220, rules engine 110, and decision engine 150 can each contain more than one memory component.

Memory 226, 236, or 246 may include one or more rules 120*a*-120*n*. Rules 120*a*-120*n* generally refer to logic, rules, algorithms, code, tables, and/or other suitable instructions embodied in a computer-readable storage medium for performing the described functions and operations of system 200. For example, rules 120*a*-120*n* may facilitate the transformation of a portion of customer data 112*a*-112*n* into code segments 126*a*-126*n*.

System 200 may include one or more computers. A computer may be any device that interacts with system 200. A computer may use a processor and a memory to execute an application in order to perform any of the functions described herein. A computer may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 200. A computer may also include a user interface, such as a display, a touchscreen, a microphone, keypad, or other appropriate terminal equipment usable by a user.

A component of system 200 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 200 without departing from the scope of the invention. For example, system 200 may include any number of assembly modules 220, rules engines 110, decision engines 150, and external modules 250. As another example, decision module 150 may communicate a request for third party data 160 from external module 250. Furthermore, the components of system 200 may be integrated or separated. For example, assembly module 220 and rules engine 110 may be incorporated into a single component. In another example, rules engine 110 and decision engine 150 may be incorporated into a single component.

Figure 3:
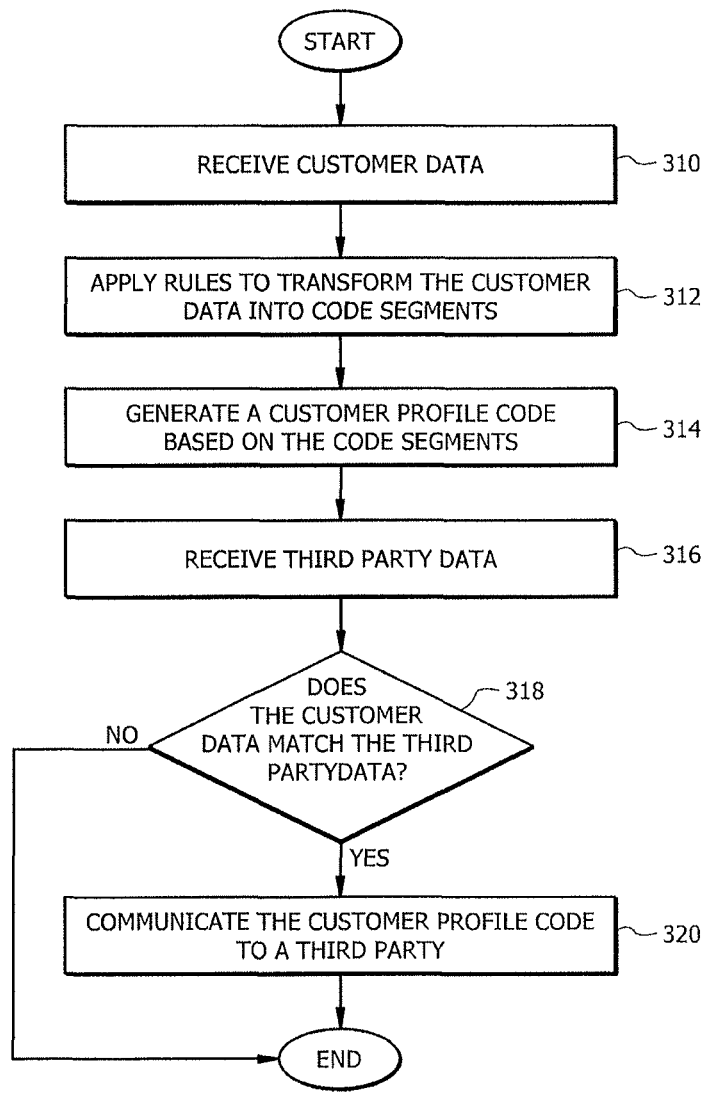
FIG. 3 illustrates an example embodiment of a method for encoding customer data.

FIG. 3 illustrates an example method for encoding customer data. The method begins at step 310 when interface of rules engine 110 receives customer data 112a-112n from data sources 228a-228n. At step 312, rules engine 110 applies rules 120a-120n to transform a portion of customer data 112a-112n into one or more data segments. For example, rules engine 110 may apply rule 120a to transform a portion of customer data 112a-112n into code segment "X1". As another example, rules engine 110 may apply rule 120b to transform a portion of customer data 112a-112n into code segment "Y2". Rules engine 110 may update rules 120a-120n periodically or continuously. At step 314, rules engine 110 generates customer profile code 140 based on the one or more data segments, for example "X1Y2". Customer profile code 140 is associated with at least one customer identifier 116. Customer identifier 116 may be a social security number, bank account number, or any other information that will identify customer 114 from the list of customers of enterprise 210. Rules engine 110 may update customer profile code 140 continuously or periodically.

At step 316, interface 242 of decision engine 150 receives third party data 160 associated with a request for customer information from external module 250. Third party data 160 is information that can be used to identify a customer, such as an address, telephone number, social security number, or bank account number. Decision engine 150 determines whether customer identifier 116 matches third party data 160 at step 318.

If customer identifier 116 matches third party data 160, the method proceeds to step 320. At step 320, interface 242 of decision engine 150 communicates customer profile code 140 to third party 162 at a communication time period. For example, if customer identifier 116 of customer 114 is represented as account number "ABCXYZ", and third party data 160 is represented as account number "ABCXYZ", then customer identifier 116 matches third party data 160 and interface 242 communicates customer 114's profile code 140 to third party 162. Interface 242 of decision engine 150 may communicate a plurality of customer profile codes 140 simultaneously, or decision engine 150 may transmit each customer profile code 140 separately to third party 162. In certain embodiments, interface 242 of decision engine 150 may communicate updated customer profile codes 140 to third party 162. In some instances, decision engine 150 may communicate customer profile codes 140 via an API. The communication time period indicates a time or periodicity to communicate the data. The communication time period can be a fixed time period, a variable time period, a time period that occurs when network resource usage is at a low period, or any indication of when interface 242 of decision engine 150 should communicate customer profile code 140.

If decision engine determines customer identifier 116 does not match third party data 160 at step 318, then decision engine 150 does not communicate customer profile code 140 to third party 162. In some embodiments, processor 244 of decision engine 150 generates a data report. For example, the data report may state that the third party data 160 did not match customer identifiers 116a-116n. In some embodiments, interface 242 of decision engine 150 may communicate the data report to third party 162. The data report may include information such as the number of requests for customer information communicated to decision engine 150 within a period of time, the number of requests processed by decision engine 150 within a period of time, or the number of matches or non-matches generated by decision engine 150.

Modifications, additions, or omissions may be made to the method depicted in FIG. 3. The method may include more, fewer, or other steps. For example, if customer identifier 116 matches third party data 160, interface 242 of decision engine 150 may communicate one or more rules 120a-120n to third party 162. As another example, if customer identifier 116 matches third party data 160, interface 242 of decision engine 150 may communicate code segments to third party 162 to facilitate decoding of customer profile code 140. As yet another example, steps may be performed in parallel or in any suitable order. Further, any suitable component of system 200 may perform one or more steps of the method.

Figure 4:
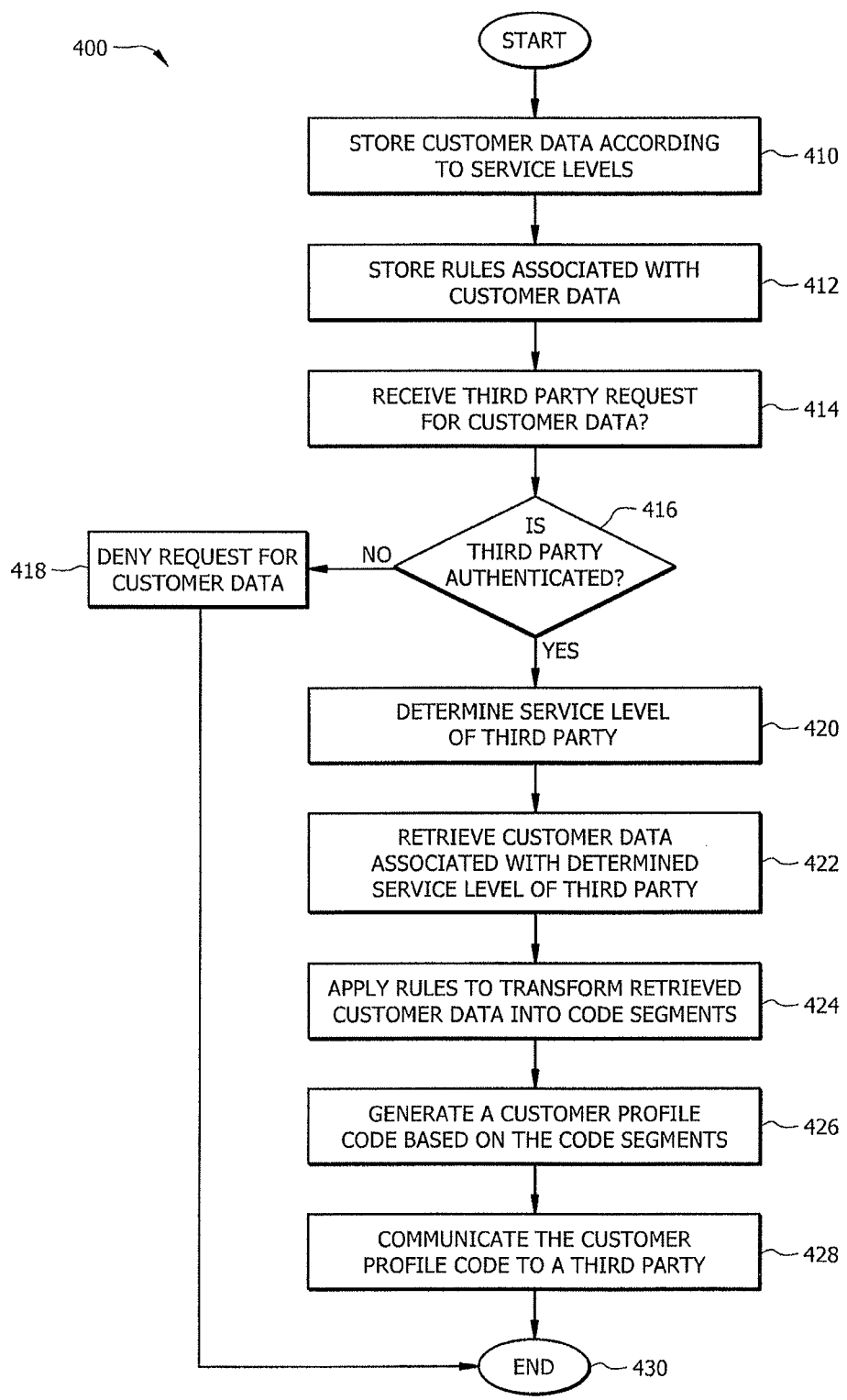
FIG. 4 illustrates an example embodiment of a method for encoding customer data according to service levels.

FIG. 4 illustrates an example embodiment of a method for encoding customer data 112 according to service levels 113. The method begins at step 410 where memory 236 stores customer data 112 according to service levels 113, as described above. At step 412, memory 236 also stores rules 120. At step 414, one or more components of enterprise 210 receives a third party request for customer data 112, such as from external module 250. Execution then proceeds to step 416 where one or more components of enterprise 210 determines whether the third party that communicated the request is authenticated. In one example, enterprise 210 signs up third parties to an account with associated service levels 113. This account information may be stored as part of third party data 160. Then, decision engine 150 determines whether an active account exists for the third party that communicated the request. If not, then the third party is not authenticated and execution proceeds to step 418 where the third party request is denied and execution subsequently terminates at step 430. If an active account does exist for the third party that communicated the request, then the third party is authenticated and execution proceeds to step 420 where decision engine 150 determines the service level 113 of the third party.

At step 422, decision engine retrieves customer data 112 associated with the service level 113 determined at step 420. At step 424, rules engine 110 applies the rules 120 to this customer data 112 to transform the customer data 112 into code segments 126, 136, as described above. At step 426, rules engine 110 generates a customer profile code 140 based on the code segments generated at step 424. Interface 232 communicates the customer profile code 140 to the third party at step 428 and execution terminates at step 430.

Figure 5:
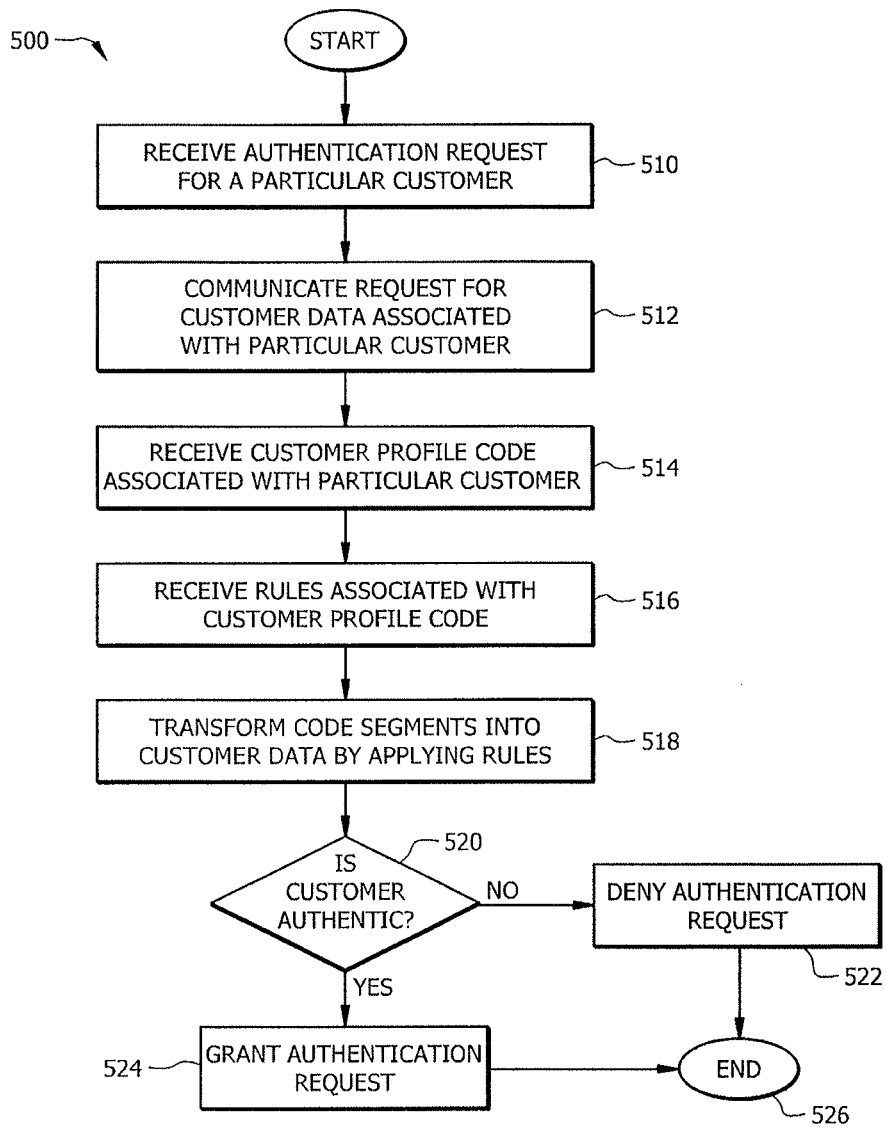
FIG. 5 illustrates an example embodiment of a method for decoding customer data to authenticate a customer.

FIG. 5 illustrates an example embodiment of a method for decoding customer data 112 to authenticate a customer 114. This method is performed by a third party, such as external module 250. The method begins at step 510 where external module 250 receives an authentication request for a particular customer 114. As described above, for example, this authentication request may be received in conjunction with an attempt to verify a customer's identity or in conjunction with determining whether to extend a line of credit to a customer 114. At step 512, external module 250 communicates a request for customer data 112 associated with the particular customer 114 to enterprise 210. At step 514, external module 250 receives a customer profile code 140 associated with the particular customer 114 for whom the request was made. The customer profile code 140 is an encoded representation of the customer data 112 for the customer 114 and includes one or more code segments 126, 136. At step 516, external module 250 also receives rules 120 associated with the customer profile code 140 received at step 514. At step 518, external module 250 transforms the code segments 126, 136 into customer data 112 by applying the rules 120 received at step 516.

Upon transforming the code segments 126, 136 into customer data 112, external module 250 determines whether the customer 114 is authentic at step 520. For example, external module 250 may receive a customer's financial information to determine whether to extend a line of credit to customer 114. Or, it may receive a customer's biographical data to verify the identity of the customer 114. If the customer 114 is not authenticated at step 520, execution proceeds to step 522 where external module 250 denies the authentication request received at step 510. If the customer 115 is authenticated at step 520, execution proceeds to step 524 where external module 250 grants the authentication request received at step 510 (e.g., verifies the customer 114 or decides to extend a line of credit to customer 114). Execution terminates at step 526.

Figure 6:
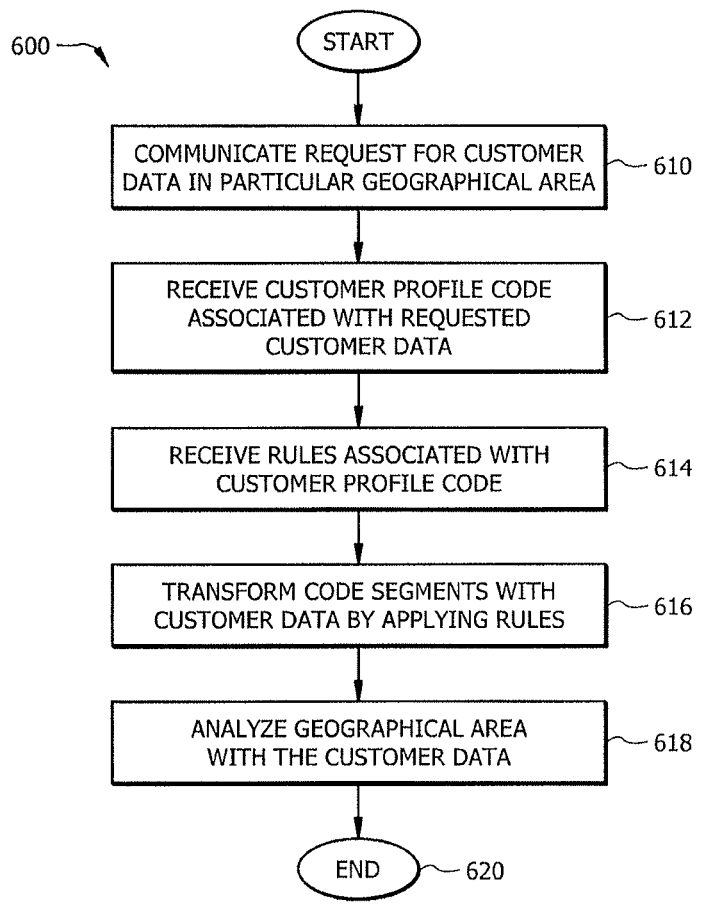
FIG. 6 illustrates an example embodiment of a method for decoding customer data to analyze a geographical area.

FIG. 6 illustrates an example embodiment of a method for decoding customer data 112 to analyze a geographical area. This method is performed by a third party, such as external module 250. The method begins at step 610 where external module 250 communicates a request for customer data 112 to enterprise 210. The request is associated with a particular geographical area, such as, for example, one or more cities or zip codes. Thus, the request is for customer data 112 for customers 114 in the identified geographical area. Execution proceeds to step 612 where external module 250 receives a customer profile code 140 associated with the particular customer 114 for whom the request was made. The customer profile code 140 is an encoded representation of the customer data 112 for the customer 114 and includes one or more code segments 126, 136. At step 614, external module 250 also receives rules 120 associated with the customer profile code 140 received at step 612. At step 616, external module 250 transforms the code segments 126, 136 into customer data 112 by applying the rules 120 received at step 614.

Upon transforming the code segments 126, 136 into customer data 112, external module 250 analyzes the geographical area using the customer data 112 at step 618. In one embodiment, a third party that requests this customer data 112 specific to a particular geographic area may use it to analyze the potential market for particular goods and services in that geographical area. For example, a third party merchant may use this information to determine which additional geographic markets it should or should not enter, or which targeted goods or services to offer in a particular existing geographic market. Execution terminates at step 620.

Figure 7:
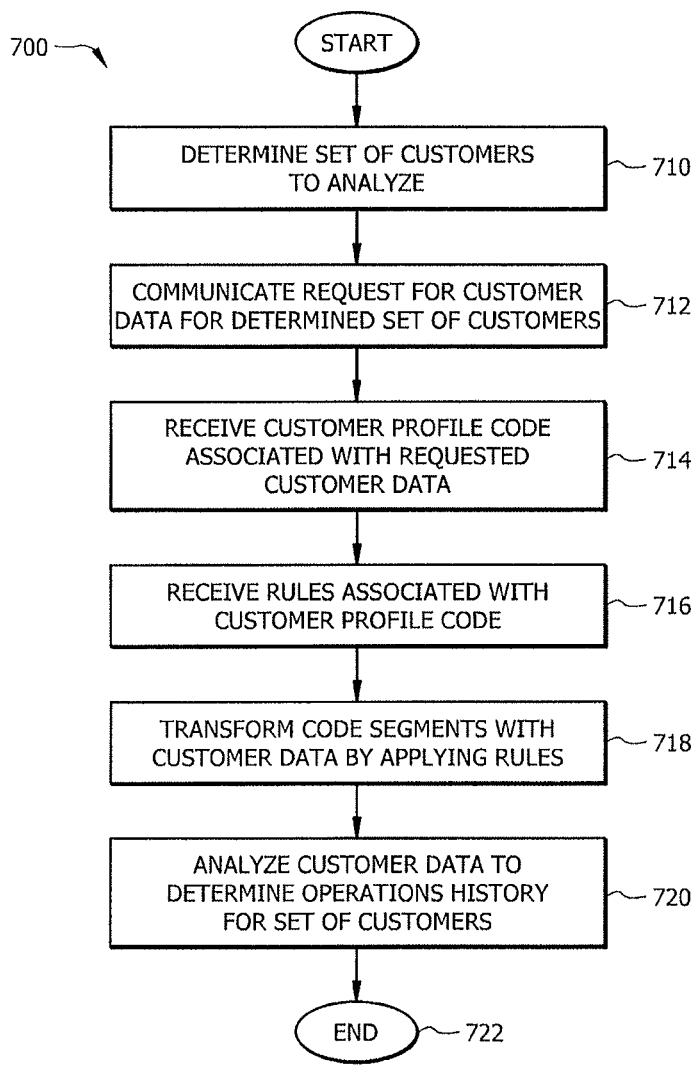
FIG. 7 illustrates an example embodiment of a method for decoding customer data to determine an operations history for a set of customers.

FIG. 7 illustrates an example embodiment of a method for decoding customer data 112 to determine an operations history for a set of customers 114. This method is performed by a third party, such as external module 250. The method begins at step 710 where external module 250 determines a set of customers 114 to analyze. For example, a third party merchant may determine one or more of its existing or potential customers 114 to analyze. Execution proceeds to step 712, where external module 250 communicates a request for customer data 112 to enterprise 210. The request is associated with the subset of customers 114 determined at step 710. Execution proceeds to step 714 where external module 250 receives a customer profile code 140 associated with the particular customers 114 for whom the request was made. The customer profile code 140 is an encoded representation of the customer data 112 for the customers 114 and includes one or more code segments 126, 136. At step 716, external module 250 also receives rules 120 associated with the customer profile code 140 received at step 714. At step 718, external module 250 transforms the code segments 126, 136, into customer data 112 by applying the rules 120 received at step 716.

Upon transforming the code segments 126, 136 into customer data 112, at step 720, external module 250 analyzes customer data 112 to determines the operations history for the set of customers determined at step 710. For example, third party merchant may use the customer data 112 received generated at step 718 to determine the operations history of the set of customers 114 determined at step 710 (e.g., where that set of customers 114 spends money to purchase goods and services; how much money that set of customers 114 spends on goods and services; the frequency of spending for that set of customers 114; etc.). The third party merchant can then use this information to target those locations for its own sales and marketing. Execution terminates at step 722.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

To aid the Patent Office, and any readers of any patent issued on this application in interpreting the claims appended hereto, applicants note that they do not intend any of the appended claims to invoke 35 U.S.C. §112(f) as it exists on the date of filing hereof unless the wods "means for" or "step for" are explicitly used in the particular claim.

What is claimed is:
1. A system for authenticating a customer, comprising:
a network interface that:
communicates a request for customer data associated with a particular customer;
receives a customer profile code associated with the customer data in response to the request, wherein the customer profile code comprises a first code segment and a second code segment;
receives a first rule associated with the customer profile code, wherein the first rule comprises a first plurality of conditions; and receives a second rule associated with the customer profile code, wherein the second rule comprises a second plurality of conditions; and a processor communicatively coupled to the interface and that:

transforms the first code segment into a first portion of customer data using the first rule and the first plurality of conditions;

transforms the second code segment into a second portion of customer data using the second rule and the second plurality of conditions; and authenticates the customer using the first portion of customer data and the second portion of customer data.

2. The system of claim 1, wherein authenticating the customer comprises using the customer data to extend credit to the customer.

3. The system of claim 1, wherein authenticating the customer comprises verifying the identity of the customer using the customer data.

4. The system of claim 1, wherein the customer data comprises salary data, customer deposit information, or customer credit data.

5. The system of claim 1, wherein the network interface receives a request to authenticate the customer prior to communicating the request for customer data.

6. A method for authenticating a customer, comprising:

communicating a request for customer data associated with a particular customer;

receiving a customer profile code associated with the customer data in response to the request, wherein the customer profile code comprises a first code segment and a second code segment;

receiving a first rule associated with the customer profile code, wherein the first rule comprises a first plurality of conditions;

receiving a second rule associated with the customer profile code, wherein the second rule comprises a second plurality of conditions;

transforming the first code segment into a first portion of customer data using the first rule and the first plurality of conditions;

transforming the second code segment into a second portion of customer data using the second rule and the second plurality of conditions; and authenticating the customer using the first portion of customer data and the second portion of customer data.

7. The method of claim 6, wherein authenticating the customer comprises using the customer data to extend credit to the customer.

8. The method of claim 6, wherein authenticating the customer comprises verifying the identity of the customer using the customer data.

9. The method of claim 6, wherein the customer data comprises salary data, customer deposit information, or customer credit data.

10. The method of claim 6, wherein the network interface receives a request to authenticate the customer prior to communicating the request for customer data.

11. A tangible, non-transitory computer readable medium containing program instructions that when executed by a computer perform:

communicating a request for customer data associated with a particular customer;

receiving a customer profile code associated with the customer data in response to the request, wherein the customer profile code comprises a first code segment and a second code segment;

receiving a first rule associated with the customer profile code, wherein the first rule comprises a first plurality of conditions;

receiving a second rule associated with the customer profile code, wherein the second rule comprises a second plurality of conditions;

transforming the first code segment into a first portion of customer data using the first rule and the first plurality of conditions;

transforming the second code segment into a second portion of customer data using the second rule and the second plurality of conditions; and authenticating the customer using the first portion of customer data and the second portion of customer data.

12. The computer readable medium containing program instructions of claim 11, wherein authenticating the customer comprises using the customer data to extend credit to the customer.

13. The computer readable medium containing program instructions of claim 11, wherein authenticating the customer comprises verifying the identity of the customer using the customer data.

14. The computer readable medium containing program instructions of claim 11, wherein the customer data comprises salary data, customer deposit information, or customer credit data.

15. The computer readable medium containing program instructions of claim 11, wherein the network interface receives a request to authenticate the customer prior to communicating the request for customer data.

* * * * *